(No Model.)
A. L. STIETENROTH.
FEEDER FOR COTTON GINS.
No. 278,195. Patented May 22, 1883.
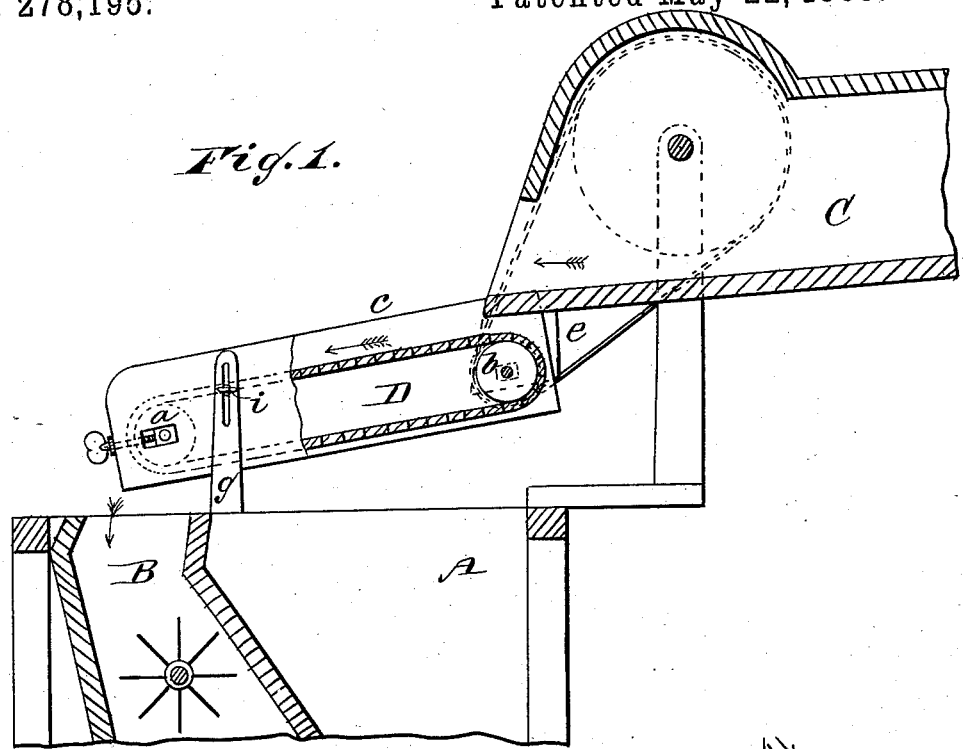
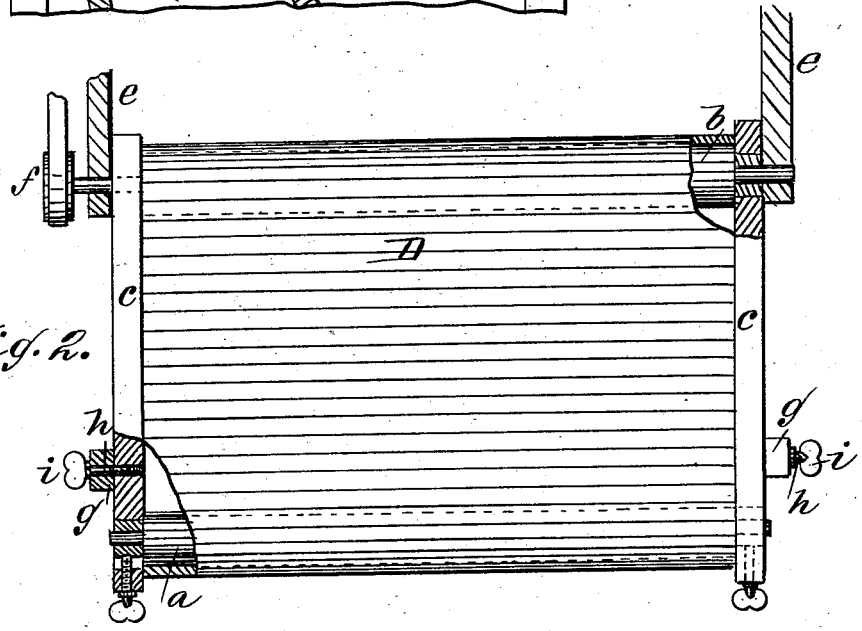
WITNESSES:
Theo. G. Hoster
C. Sedgwick
INVENTOR:
A. L. Stietenroth
BY Munn & Co
ATTORNEYS.

UNITED STATES PATENT OFFICE.

ANDREW L. STIETENROTH, OF NATCHEZ, MISSISSIPPI.

FEEDER FOR COTTON-GINS.

SPECIFICATION forming part of Letters Patent No. 278,195, dated May 22, 1883.

Application filed February 28, 1883. (No model.)

*To all whom it may concern:*

Be it known that I, ANDREW L. STIETENROTH, of Natchez, in the county of Adams and State of Mississippi, have invented a new and Improved Feeder for Cotton-Gins, of which the following is a full, clear, and exact description.

Feeders as usually applied to cotton-gins are placed so far forward as to obstruct the mouth of the feed-box, so that convenient access to the gin proper for cleaning the brush and the grate is prevented.

The object of the invention is to improve the connection between the feed-box and the feeder, as hereinafter described and claimed.

Reference is to be had to the accompanying drawings, forming part of this specification, in which similar letters of reference indicate corresponding parts in both the figures.

Figure 1 is a vertical section of a gin feed-box and feeder with my improvements, and Fig. 2 is a plan view of the feed-apron, partially in section.

The gin-stand A, feed-box B, and feeder C are of ordinary construction and arrangement, except that the feeder is set back on the stand a suitable distance, instead of being placed with its discharge end over the mouth of the feed-box, as usual.

D is an endless apron of jointed slats or bars, of any suitable character, carried by rollers $a$ $b$, which are journaled in side bars, $c$ $c$, the shaft of the rear roller, $b$, passing through hangers $e$, that depend from the feeder C, so that the rear end of the apron is supported in position for receiving the cotton from the feeder. The shaft of roller $b$ also carries a pulley, $f$, for connection of power to rotate the roller $b$ and cause the movement of the apron, and the apron being thus hung on the axis of its driving-roller, it can be raised and lowered without disconnecting the power. The forward end of the apron terminates above the mouth of the feed-box B, and is supported by legs or posts $g$ $g$, through which pins $h$ $h$ project from the bars $c$, the posts $g$ being slotted and the pins $h$ provided with clamping-nuts $i$, so that the height of the apron may be regulated at will. The front roller, $a$, of the apron is made adjustable for tightening the apron and the side bars, $c$, project above the sides of the apron for retaining the cotton thereon.

By this construction and arrangement the cotton is fed to the gin by the apron, which can be readily raised to give access to the brush and grate, and for raising the breast-board of the gin. The endless apron has its slats closely jointed together, and this prevents the bolls that escape between the carrier and picker roller of the feeder from dropping upon the gin, and prevents the sifting of sand and dust from the cotton upon the boxes and journals. By thus arranging for the convenient cleaning of the brush and grate the danger of fire from neglect of that work is much lessened.

The feed-apron can be operated directly from the saw-shaft, or a counter-shaft may be used with connections to the picker-roller of the feeder, and from thence to the shaft of the apron-roller, in which case the counter-shaft will be fitted with a lever for throwing the power on and off. These arrangements may be as desired.

Having thus described my invention, I claim as new and desire to secure by Letters Patent—

The combination, with the feeder C, endless apron D, and rollers $a$ $b$, of the pivoted side bars, $c$ $c$, the slotted legs $g$ $g$, the pins $h$, and the nuts $i$, whereby the said apron can be raised, as and for the purpose specified.

ANDREW LIVINGSTON STIETENROTH.

Witnesses:
FRED J. V. LE CAND,
WALTER McCREA.